Nov. 6, 1928.

W. J. BOYLE, JR 1,690,713

PRESSURE TEST APPARATUS

Filed April 25, 1927

Inventor.
Willis J. Boyle Jr.

Attorney.

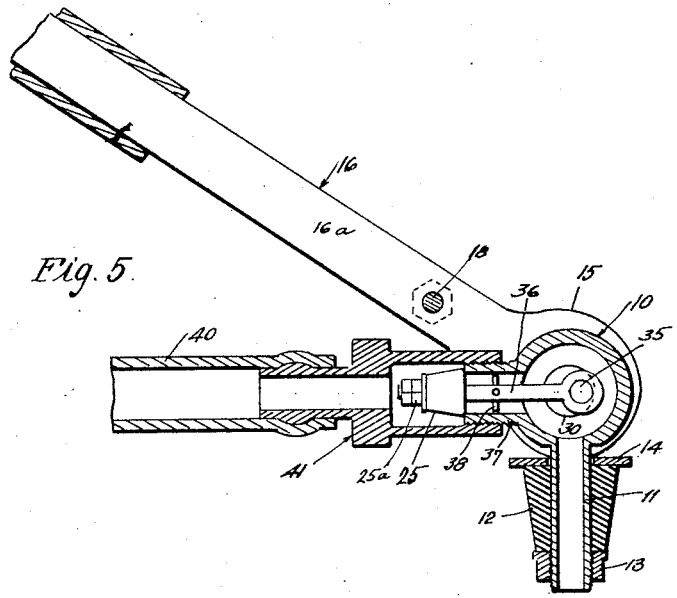
Fig. 5.
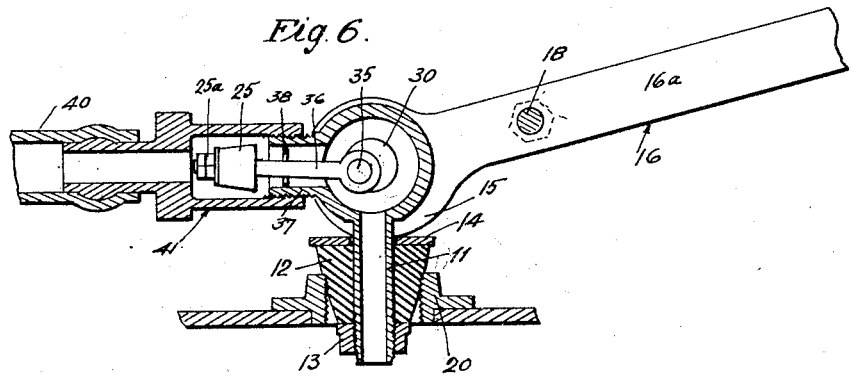
Fig. 6.
Inventor
Willis J. Boyle Jr.
Attorney Patented Nov. 6, 1928.

1,690,713

UNITED STATES PATENT OFFICE.

WILLIS J. BOYLE, JR., OF LOS ANGELES, CALIFORNIA, ASSIGNOR TO BOYLE MANUFACTURING COMPANY, OF LOS ANGELES, CALIFORNIA, A CORPORATION OF CALIFORNIA.

PRESSURE-TEST APPARATUS.

Application filed April 25, 1927. Serial No. 186,312.

This invention has relation to the art of testing containers under pressure; the object of the invention is to provide a simple and effective device for applying test pressure to a container.

Although the invention is applicable wherever pressure testing is carried on, and applicable to pressure holding containers of any type, the device is particularly useful where large numbers of containers are tested; one characteristic feature of the device being its quick and easy application to the container and the equally quick and easy application of pressure by a simple operation of the device itself. These matters are of some importance where large numbers of containers are being manufactured and tested. For instance, in the manufacture of metallic barrels or casks it is necessary that the finished article be pressure tested to determine that joints and seams are tight; and it is desirable that the pressure test device be quickly and easily applicable, that pressure can be quickly and effectively applied to the container, and that the device be quickly and easily removable from the container after the test is completed.

Containers of the kind above spoken of are usually provided with a bung or similar hole—usually a screw-threaded hole adapted to take a plug. My device is so constructed that one part of it, equipped with an expansive gasket, may be placed in the hole; then by a simple movement of the control handle or lever the expansive gasket is expanded into pressure-tight engagement with the walls of the hole and at the same time the valve is opened to admit pressure to the interior of the container. When the test is completed a reverse movement of the handle contracts the gasket to allow easy removal of the device and simultaneously closes the pressure valve to prevent escape of pressure fluid when the device is not in use.

The preferred details of an illustrative form of device embodying the invention will thus be best understood from the following specific description, reference for this purpose being had to the accompanying drawings in which:

Fig. 5 is a longitudinal section on line 5—5 of Fig. 3; Figures 2 to 5 showing the device in what may be termed its inoperative position; and Fig. 6 is a section similar to that of Fig. 5 but showing the device in its operative position with the gasket expanded and the pressure valve open.

Figure 1:
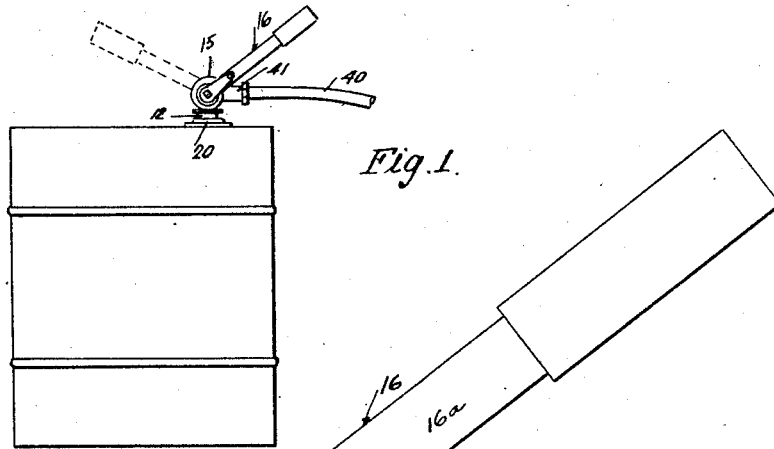
Fig. 1 is an elevation showing the application of the pressure testing device to a barrel.
Figure 2:
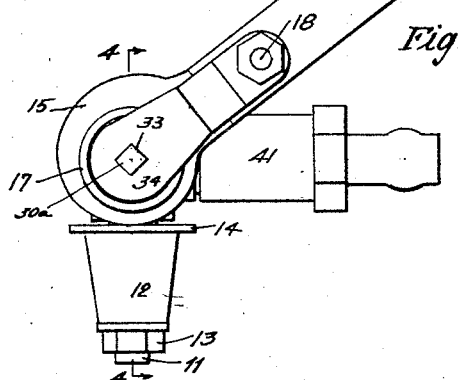
Fig. 2 is an enlarged side elevation of the device itself.
Figure 4:
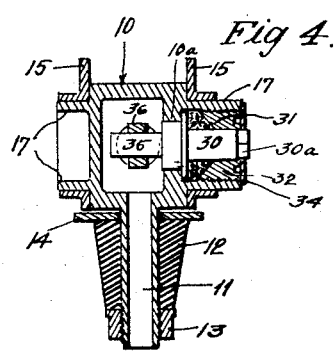
Fig. 4 is a section on line 4—4 of Fig. 2.
Figure 3:
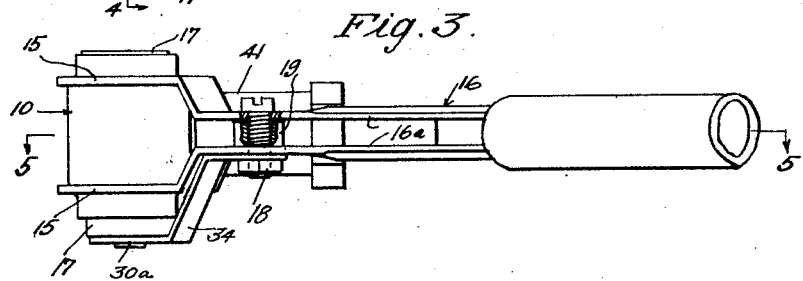
Fig. 3 is a plan of the same.

In the drawings the device is shown as having a hollow body 10, somewhat cylindric in form. Depending from this hollow body is a nipple 11 surrounded by a conical gasket member 12 composed of any suitable expansive substance. Rubber does very well for this pupose. The lower smaller end of gasket member 12 rests upon an adjustable nut 13 screw-threaded onto the lower end of nipple 11. A washer 14 rests on top of gasket 12 and this washer may be pressed down by the action of two cam members 15 to which handle 16 is connected. In fact, in the specific form herein shown, the two cam members 15 are made integral with the two members 16ª of the handle. The two cams 15 are journalled upon two cylindric flanges 17 which project from opposite ends of body 10, one of these flanges 17 also serving as the housing for a packing gland, hereinafter referred to. The two parallel handle members 16ª are spacedly connected together by a bolt 18 and a spacer 19.

From an inspection of the drawings it will be seen that when handle 16 is thrown from the position of Fig. 5 to that of Fig. 6 the gasket 12 is compressed longitudinally and expanded radially. In the position of Fig. 5 the gasket 12 may readily be inserted in the barrel fitting 20; and then by throwing the handle to the position of Fig 6 the gasket is expanded tightly within fitting 20 so as to make a fluid tight joint with that fitting. At the same time this movement of the handle opens a valve 25, the valve being closed in the position of Fig. 5 and open in the position of Fig. 6. The preferred arrangement and mechanism for operating the valve will now be described.

A shaft 30 is journalled in the end wall 10ª of the hollow cylindrical body 10 and also extends through the packing gland 31 and is journalled in the follower 32, a squared end 30ª of the shaft extending through the follower 32 to be engaged by a square hole 33 in a member 34 that is secured to the handle by bolt 18. The shaft 30 therefore turns with the handle. Inside hollow body 10 this shaft has an eccentric or crank pin 35 to which a small valve operating rod 36 is connected. This rod extends out through the pressure inlet nipple 37 and is provided with guide pins 38 so that the rod is guided substantially centrally of the pressure inlet nipple. At its outer end rod 36 carries the valve 25, the valve being in the form of a simple compression stopper which seats on the end of the nipple 37 when the parts are in the position of Fig. 5. Adjustable nuts 25ª behind the valve enable its position to be adjusted for proper operation. The relative position of crank pin 35 is such that when parts are in the position of Fig. 5 the valve 25 is thrown to its closed position; while in the position of Fig. 6 the valve is turned to its open position.

A pressure hose 40 is connected with pressure inlet nipple 37 through the medium of a fitting 41 which is screw-threaded onto the outside of nipple 37.

The operation and use of the device will be apparent from the foregoing description of its structure. The operator can carry the device handily by the handle 16. Holding the handle in the relative position of Fig. 5 he applies the device to the container by simply inserting gasket 12 in the hole of fitting 20, and by throwing the handle from position of Fig. 5 to the position of Fig. 6. In the position of Fig. 6 the fluid under pressure is admitted to the container and cannot leak out past gasket 12. When the test is completed it is only necessary to throw handle 16 back to the position of Fig. 5 and remove the device.

I claim:

1. In a pressure testing device, the combination of a hollow body having a pressure inlet opening and a pressure outlet opening, an external and expansible gasket associated with one opening and adapted to be inserted in an aperture of the article to be tested, a valve associated with the other opening, an operating handle mounted on the body, and connective means whereby movement of the operating handle simultaneously expands said gasket tightly in such aperture and opens said valve.

2. In a pressure testing device, the combination of a hollow pressure receiving body, an outlet nipple extending from the body, a longitudinally compressible and radially expansible gasket around the outlet nipple, a handle rotatably mounted upon the body, a cam connected with the handle and adapted upon movement of the handle to press longitudinally upon the gasket to compress it longitudinally and expand it radially, an inlet nipple extending from the body, a crank shaft extending into the body from the outside, a connecting rod connected to the crank shaft within the body, a valve mounted upon the connecting rod and adapted to close and open the passage through the inlet nipple, and a member connected to the handle and said crank shaft to cause rotation of the shaft upon rotation of the handle.

3. In a pressure testing device, the combination of a hollow pressure receiving body having an outlet nipple depending from its lower side and an inlet nipple extending from a lateral side, a bifurcated handle rotatably mounted upon the body and provided with a pair of cams one located at each side of the body, a longitudinally compressible and radially expansible gasket mounted on the outlet nipple, a pressure washer mounted upon said gasket and adapted to be operated upon by said handle cams to move the washer down and compress the gasket upon rotation of the handle about the body, a crank shaft journalled in the body and extending through one of its walls, the inner end of said crank shaft having a valve operating crank, a connecting rod connected with said crank, a valve stopper mounted on said connecting rod and adapted to close and open the passage through the inlet nipple, a packing gland on the body through which said crank shaft extends outwardly, the outer end of shaft being squared, and a member attached to and mounted upon the handle and engaging the squared end of said shaft to cause said shaft to rotate with the handle.

In witness that I claim the foregoing I have hereunto subscribed my name this 14th day of April 1927.

WILLIS J. BOYLE, Jr.